UNITED STATES PATENT OFFICE.

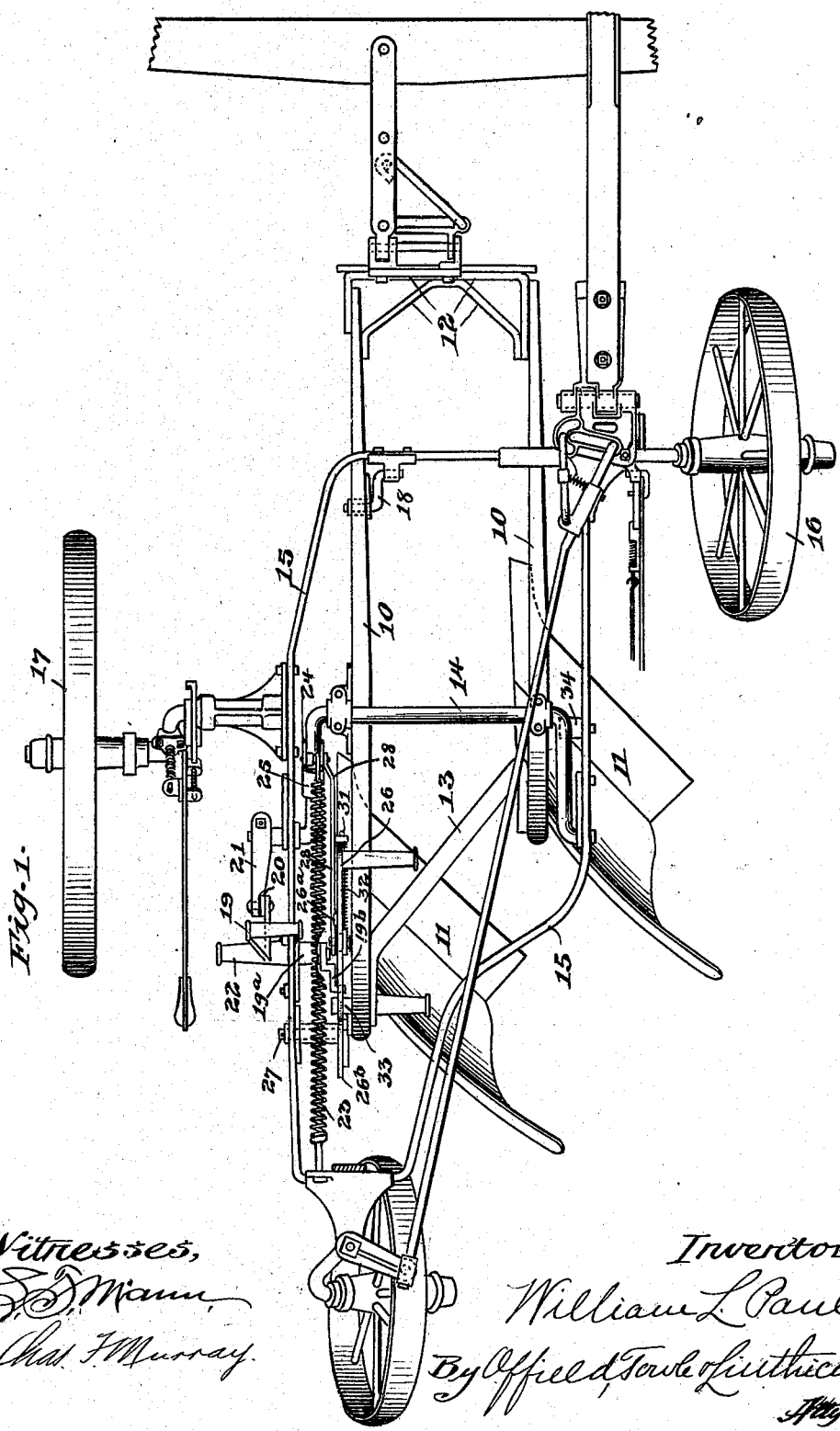

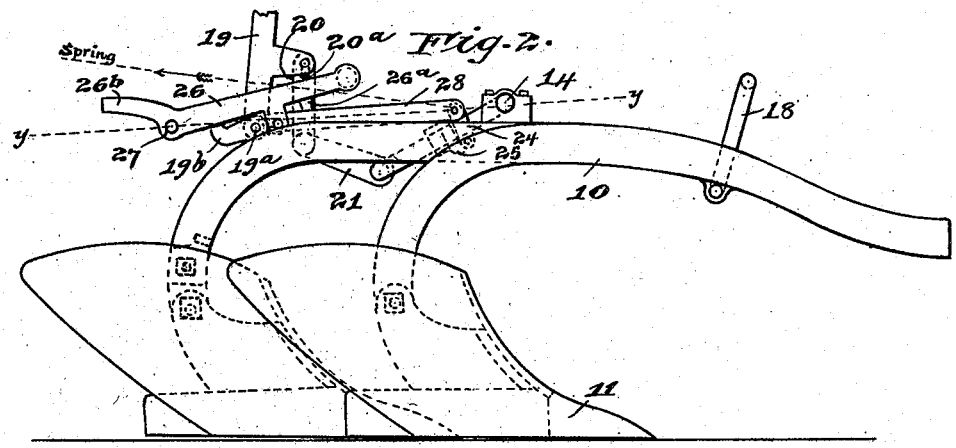
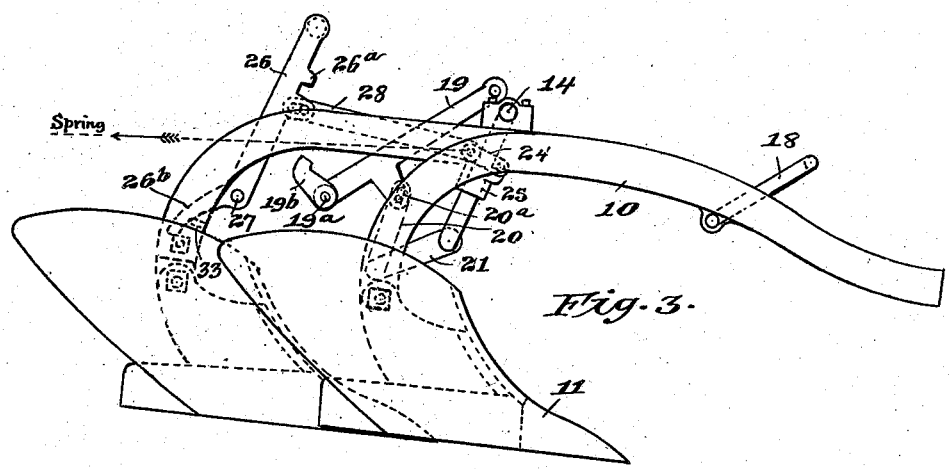
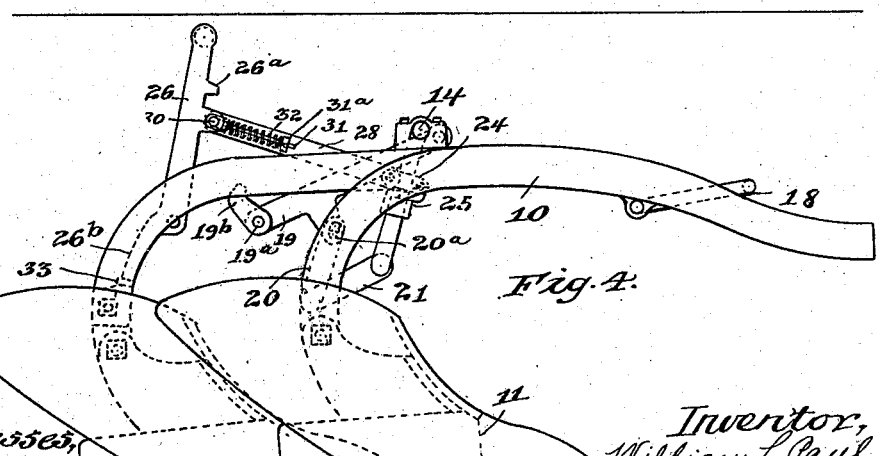

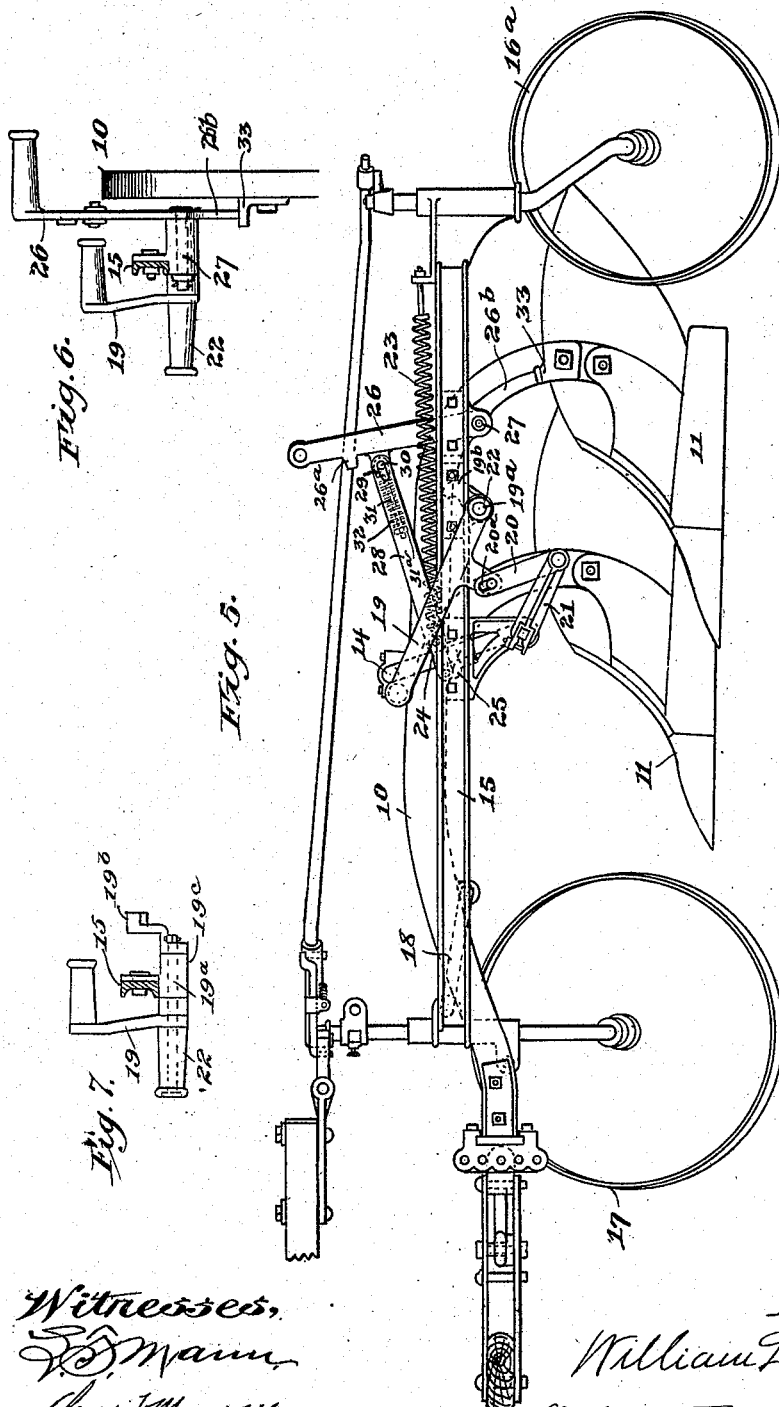

WILLIAM L. PAUL, OF PERU, ILLINOIS, ASSIGNOR TO PERU PLOW & WHEEL COMPANY, OF PERU, ILLINOIS, A CORPORATION OF ILLINOIS.

WHEEL-PLOW.

No. 885,078.      Specification of Letters Patent.      Patented April 21, 1908.

Application filed June 13, 1906. Serial No. 321,561.

*To all whom it may concern:*

Be it known that I, WILLIAM L. PAUL, a citizen of the United States, and a resident of Peru, Lasalle county, Illinois, have invented certain new and useful Improvements in Wheel-Plows, of which the following is a specification.

This invention relates to certain improvements in wheeled plows, and more particularly to the mounting of the plow.

Sulky and gang plows sometimes have the plow mounted on one bail and sometimes on two. When two bails are employed they move substantially in parallelism, the front bail being usually shorter and swinging in a smaller arc than the rear bail, so as to give the plow point a downward inclination to assist it to enter the ground, the movements of the plow being uniform through their range, and the raising and lowering movement being communicated through both to the plow beam. Where a single bail is employed there is usually associated therewith a bell crank or cam plate at the rear of the plow beam to give to the plow a tilting movement to assist it to enter the ground, the raising movement, of course, being in the same lines, but in reverse direction. Where a single bail is employed the plow rocks or tilts over the straight portion of the bail as an axis, and a positive lock is employed for holding the plow both in the raised and lowered position. In such construction the plow being locked rigidly to the frame must of course follow variations of the land wheel with reference to the general surface of the ground, such variations being caused by the wheel passing over uneven ground, or else the weight of the driver and frame will be transmitted to the plow itself while the land wheel will carry no weight. As these variations of the surface are usually abrupt, it results that the plow does not partake of the downward movement of the wheel, and therefore the weight of the frame and driver in passing over short depressions is transmitted to the plow bottom, materially increasing the draft.

To assist in lifting the plows a powerful spring is employed, one end fastened to the beams and the other end to a point on the frame. The ordinary type of plow must be locked down or the spring will tend to lift the plows out of the ground.

It is the purpose of my invention to mount the plow flexibly in the frame and to avoid locking it rigidly to the frame when down; and to prevent the lifting spring from drawing the plows from their work I have devised mechanism which relieves the plow entirely from the spring tension when the plow is in the ground, and I so arrange the bail and its connections that the plow is not raised by the draft or other forces.

The frame serves only the purpose of carrying the weight of the driver and affording the necessary rigid mount for the controlling mechanism for the plow itself. A stop is employed to limit the descent of the plow relative to the frame. The essential feature of this new mounting is the provision of a single bail which serves as the carrying member for the plow and connects the plow beam to the frame and a guiding or controlling link arranged at the front end of the beam connecting the beam with the frame, this link being in effect a suspension member swinging from its upper end instead of from its lower end, as in the usual double bail construction. It results from this construction and the elimination of the spring tension when the plow is in the ground that a lock to hold the plow in the ground is unnecessary, for the draft is exerted on the bail and in a line perpendicular to the path of the swinging link, the link itself affording a swinging strut tending to hold the plow in the ground instead of tending to lift it as in the double bail construction and the spring being inoperative.

In the accompanying drawings I have shown my several improvements embodied in a gang plow, such parts only being illustrated in detail as are necessary to an understanding of my invention.

Figure 1 is a plan view of a plow, parts of the evener and draft pole being broken away; Figs. 2, 3 and 4 are elevations showing the plows and their beams and controlling mechanisms, three positions being indicated; Fig. 5 is a side elevation and; Fig. 6 is a detail view of the controlling levers, frame and beam; Fig. 7 is a vertical cross-section through the machine frame illustrating in detail the lifting lever.

It will be understood that my improvements may be used in connection with a single plow or with a gang, and that the frame, carrying wheels and leveling devices may be of any approved or desired construction.

In the drawings, 10, represents the plow beams to which are attached the plows, 11. The beams, 10, are rigidly joined at their front and rear ends by bars, 12—13. The plow beams are mounted upon a single bail, 14, pivoted in a frame, 15, which is or may be of any approved form and construction. This frame is mounted on a furrow wheel, 16, a land wheel, 17, and a rear furrow wheel, $16^a$. The furrow wheels are caster wheels and the land wheel has a crank axle to which is applied a raising and lowering lever. A guiding and controlling link, 18, pivotally connects the front end of one of the beams, 10, with the frame in such manner as to act both as a suspension member and as a swinging strut.

A lifting lever, 19, is pivoted to the frame at $19^a$, in a bracket $19^c$ and carries a tripping lug, $19^b$. Said lever is connected by means of a link, 20, to an arm, 21, on the end of the bail. Said link has a slot, $20^a$, at one end to admit of a slight travel of the lifting lever before its action on the bail is effective.

22 is a foot rest located in line with the pivot of the arm.

23 is a lift spring connected at its rear end to the frame and at its forward end to a clevis, 24, which straddles the bail and is pivoted in front thereof to a sleeve, 25, surrounding the bail. The plow beams, 10, are pivotally mounted on the bail, the latter affording the support for the beams and the draft connection from the beams to the wheel frame.

A trip lever, 26, is pivoted at 27, to a bracket on the frame and is connected by means of a link, 28, to the clevis, 24. The link has a slot, 29, in which a pin, 30, on the lever has a slight travel. A rod, 31, has an eye passing around the pin, 30, and its opposite end extends through a keeper, $31^a$, on the link, and a spring, 32, surrounds the rod and abuts against the keeper and the lug carrying the pin, 30.

The trip lever, 26, has a stop lug, $26^a$, to engage the link and a depending member, $26^b$, which engages a lug, 33, on the plow beam and the spring 32 holds the lever, 26, in contact with the lug, 33, to lock the plows in the raised position. This position is indicated in Figs. 4 and 5.

To lower the plows, the trip lever, 26, is moved forward which carries its depending member $26^b$, out of contact with the lug, 33, as shown in Fig. 3. This initial unlocking movement is permitted by the travel of the pin, 30, in the slot, 29, and as the forward movement of the lever, 26, continues, the force exerted through the lever, supplemented by the weight of the plows causes the bail to rock forwardly, thus lowering the plows. At the same time the link, 18, commences its swinging movement, depressing the front end of the beam and causing a rocking movement of the beam over the bail. The pivots are so arranged that the heel of the plow is lifted and the point depressed, causing the point of the plow to penetrate the earth readily under the draft.

When the plows have reached the limit of their downward movement, as shown in Fig. 2, the stop lug, $26^a$, contacts the link and the pivot of the tripping lever to its link passes below a line (see $y$—$y$ Fig. 2) drawn through the pivotal connection of the forward end of said link and the pivotal axis of the trip lever and the clevis being then free from contact with the sleeve, the spring tension is transmitted from the bail to the frame while at the same time the plows may rise when encountering obstructions. The depth of penetration is limited by a stop lug 34, on the frame, which is encountered by the bail when in extreme forward position. In other words, when the plows are down, as shown in Fig. 2, the toggle formed by lever 26 and link 28 has passed dead center, as indicated by line $y$—$y$, Fig. 2 and is prevented from further movement in the same direction by lug or stop $19^b$. The pivotal point of connection between the link 28 and the clevis 24 is therefore fixed and the tension of spring 23 operates on the fixed and non-collapsible toggle and not on the plows or bail. Owing to the fact that in this condition of the parts clevis 24 does not lie against the adjacent end of sleeve 25 the plows may rise a limited amount without throwing the spring into action thereon. As soon, however, as toggle 26—28 is collapsed the spring becomes operative again upon the bail and plows.

To raise the plows, lifting lever, 19, is advanced and by virtue of the slot in its connecting link, 20, its tripping lug, $19^b$, engages the trip lever, 26, and breaks the lock of the trip lever and its link and brings the lifting spring into action so that the plows are easily raised by the continued travel of the raising lever, and the trip lever is forced back into position to lock the plows up as before described. In raising the plows the bail swings toward a vertical position and the link, 18, toward a horizontal position. When the plows are lowered the bail has approached the horizontal position while the link closely approaches the vertical position.

In lowering the plows the draft of the team and the guidance of the link causes the plow points to enter the ground readily. In this entering movement the link has an important function, since the draft exerted on the plow would, in the absence of the link or any other controlling means, tend to cause the plow to skim along the surface or to enter the ground to less than the proper depth, but the link, acting as a swinging strut, forces the points of the plows into the ground, and this movement continues until the bail in its descent strikes the stop, 34, on the plow frame, by which time the plow beams are level and the link has assumed so nearly a vertical position as to aid in holding the plows in the ground.

From the foregoing it will be seen that the plows have a certain freedom of movement between the extreme fixed positions; that is to say, the plows while held in operative position are not rigidly locked but are capable of yielding to an obstruction such as a stone embedded in the earth. Further, it will be understood that the variation of movement of the land wheel, due to its passing over uneven ground, is not transmitted to the plow bottoms as in the case where the plows are rigidly locked to the frame in the working position.

It will be understood that the structural form and arrangement of parts are not the essence of my invention except to the extent indicated by the claims, and that while the drawings disclose the preferred embodiment of the several features of my invention, that variations in structural detail and specific combination may be made. I have shown the bail and beam controlling levers as foot levers, but it is obvious that hand levers may be substituted. It will be noted that the foot levers are so pivoted and connected to the bail and frame respectively that they incline slightly from the vertical and toward the front end of the plow, and in rocking the bail and moving the plow the leverage is effective and the operation easy and natural. I have shown a single link rocking in a bearing above the line of draft but a bail may be substituted.

While I prefer to arrange the swinging link forwardly of the bail and plow points, my invention in its broader aspect comprehends the employment of two swinging members, one of which (the bail) serves as the draft medium while the plow is in operation and to suspend the plow when in the raised position, and the other of which (the link) constitutes a swinging strut to control the movements of the plow beam, whether the strut is connected to the beam on one side or the other of the bail.

I claim:

1. In a wheeled plow, the combination with a wheeled frame and a plow beam, of a pivoted bail connecting the beam and frame, and a swinging link pivotally connected to the forward end of the beam and to the frame above the beam, substantially as described.

2. In a wheeled plow, the combination with a wheeled frame and beam, of a bail pivotally connected to the beam and a link pivotally connected to the beam forwardly of the bail pivot and to the frame above the beam, substantially as described.

3. In a wheeled plow, the combination with a wheeled frame and plow beam, of a bail pivotally connecting the plow beam and frame, a swinging link pivotally connecting the forward end of the beam with the frame, and means for rocking the bail and raising and lowering the beam, substantially as described.

4. In a wheeled plow, the combination with a wheeled frame and beam of a bail pivotally connecting the frame and beam and on which the plow may be rocked, a link pivotally connected to the beam forwardly of the bail and to the frame above the beam, means for controlling the rocking of the bail and separate means for moving the beam on its pivots whereby to raise or lower it, substantially as described.

5. In a wheeled plow, the combination with a wheeled frame and plow beam, of a bail pivotally connecting the beam and frame, a swinging link pivoted to the beam in front of the bail and to the frame above the beam, a lever for rocking the bail and a lever for controlling the beam, said beam-controlling lever being pivoted on the frame, substantially as described.

6. In a wheeled plow, the combination with a wheeled frame and plow beam, of a bail pivotally connecting the beam and the frame, a swinging link pivoted to the beam in front of the bail and to the frame above the beam, a lever for raising the beam and a lever for lowering the beam, substantially as described.

7. In a wheeled plow, the combination with the wheeled frame, of a plow beam pivotally connected thereto at two points one of said points being below and the other above the beam, whereby the beam may be raised and lowered and rocked on its pivotal support, substantially as described.

8. In a wheeled plow, the combination with a frame and beam, of a pivoted bail for connecting the plow beam and frame, a link pivotally connecting the forward end of the beam and frame and affording a swinging strut to maintain the plow in the ground during operation, and means for rocking the bail and raising and lowering the beam, substantially as described.

9. In a wheeled plow, the combination with a wheeled frame and plow beam, of a bail pivotally connecting the frame and beam, a swinging link pivotally connecting the forward end of the beam and frame, a stop for limiting the downward movement of the beam, the pivotal connections being so disposed that the plow is held in the ground by means of said strut, substantially as described.

10. In a wheeled plow, the combination of a wheeled frame and beam, a pivoted bail and a swinging link pivotally connecting the forward end of the beam and frame, a lever for lifting the beams and a lever for lowering the beams, said last-mentioned lever being provided with a lock to sustain the beam in the raised position.

11. In a wheeled plow, the combination of a wheeled frame, a plow beam, a single bail pivotally connected to the frame at a point below the free portion of the bail, a link swinging on a fixed pivot forwardly of the bail and having its free end pivotally connected to the plow beam the latter being pivotally mounted on the bail, and means for rocking the beam over the bail and for swinging the bail and link on their pivots, substantially as described.

12. In a wheeled plow, the combination of a wheeled frame and plow beam, a pivoted bail on which the beam is mounted, a lifting spring adapted to act on the bail and means for relieving the tension of the spring on the bail when the plow is in working position, substantially as described.

13. In a wheeled plow, the combination of a wheeled frame, a pivoted bail, a plow beam mounted on the bail, a spring secured to the frame and bail and a tripping lever mounted on the frame and connected with the spring and adapted to relieve the tension of the spring on the bail when the plow is in operative position, substantially as described.

14. In a wheeled plow, the combination of a wheeled frame, a bail pivoted thereon, a plow beam mounted on the bail, a lift spring connected to the frame and shiftably connected to the bail, a tripping lever pivoted to the frame and having a link engaging the shifting connection of the spring and adapted to shift said connection whereby to relieve the bail of spring tension when the plow is lowered, substantially as described.

15. In a wheeled plow, the combination with the frame, bail and plow beam of a lifting spring having one end connected to the frame and its opposite end connected to a link, said link being pivotally connected to the bail and said bail provided with a stop member coöperating with the link and a tripping lever also connected to the link and adapted to hold the latter out of contact with the stop on the bail whereby to relieve the latter of the spring tension, substantially as described.

In testimony whereof I have hereunto set my hand, this 9th day of June, 1906, in the presence of two subscribing witnesses.

WILLIAM L. PAUL.

Witnesses:
   F. B. HOAGLAND,
   PAUL E. BOEHME.